United States Patent
Uki et al.

(10) Patent No.: US 12,206,201 B2
(45) Date of Patent: Jan. 21, 2025

(54) CONNECTOR

(71) Applicant: Yazaki Corporation, Tokyo (JP)

(72) Inventors: Kazutaka Uki, Kakegawa (JP); Shoya Ueda, Fujieda (JP)

(73) Assignee: YAZAKI CORPORATION, Tokyo (JP)

( * ) Notice: Subject to any disclaimer, the term of this patent is extended or adjusted under 35 U.S.C. 154(b) by 364 days.

(21) Appl. No.: 17/875,992

(22) Filed: Jul. 28, 2022

(65) Prior Publication Data
US 2023/0032999 A1 Feb. 2, 2023

(30) Foreign Application Priority Data
Jul. 29, 2021 (JP) ................. 2021-124714

(51) Int. Cl.
*H01R 13/502* (2006.01)
*H01R 13/512* (2006.01)

(52) U.S. Cl.
CPC ....... *H01R 13/5025* (2013.01); *H01R 13/512* (2013.01); *H01R 2201/26* (2013.01)

(58) Field of Classification Search
CPC .. H01R 13/5025; H01R 13/512; H01R 43/16; H01R 2201/26; H01R 13/02; Y02T 10/70; Y02T 10/7072; Y02T 90/14; B60L 53/16

See application file for complete search history.

(56) References Cited

U.S. PATENT DOCUMENTS

| | | | |
|---|---|---|---|
| 4,998,087 A * | 3/1991 | Boulanger | H01H 35/26 337/380 |
| 10,756,498 B1 | 8/2020 | Sarraf et al. | |
| 2013/0003307 A1* | 1/2013 | Jang | H02S 40/345 361/709 |
| 2018/0175534 A1* | 6/2018 | Sugiyama | H01R 13/2464 |
| 2019/0036270 A1 | 1/2019 | Aoshima | |
| 2019/0322186 A1 | 10/2019 | Arai | |
| 2020/0212620 A1 | 7/2020 | Takahashi et al. | |

FOREIGN PATENT DOCUMENTS

| | | |
|---|---|---|
| JP | 2007-258010 A | 10/2007 |
| JP | 2017-208247 A | 11/2017 |

* cited by examiner

*Primary Examiner* — Jean F Duverne
(74) *Attorney, Agent, or Firm* — Sughrue Mion, PLLC

(57) ABSTRACT

A connector includes a terminal-equipped electric wire having a terminal connected to an end portion of an electric wire, housing to accommodate the terminal and to hold the terminal-equipped electric wire and a heat transfer member having elasticity. The housing includes a first housing having a terminal accommodating portion, and a second housing to hold the terminal-equipped electric wire. The second housing includes a resin holder to be mounted on an electric wire connection portion of the terminal and the end portion of the electric wire, and a metal holder to be externally mounted on the resin holder. The heat transfer member is disposed in a compressed and deformed state between an outer circumferential surface of at least: one of the electric wire connection portion of the terminal and the end portion of the electric wire and an inner circumferential surface of the second housing.

7 Claims, 11 Drawing Sheets

CONNECTOR

CROSS-REFERENCE TO RELATED APPLICATION

The present application claims priority to Japanese Patent Application No. 2021-1.24714 filed on Jul. 29, 2021, the entire content a which is incorporated herein by reference.

TECHNICAL FIELD

The presently disclosed subject matter relates to a connector.

BACKGROUND

In the related art, a connector installed in a vehicle has been proposed in order to supply (charge) electric power from the outside of the vehicle to a battery mounted on a vehicle such as an electric vehicle or a plug-in hybrid vehicle (see JP2017-208247A, for example). This type of connector is generally called a charging inlet.

Generally, the connector (charging inlet) described above is required to have a structure or a characteristic defined by various standards. For example, when the connector described above is actually used, a temperature of a terminal (so-called operating temperature) rises due to Joule heat generated in the terminal at the time of energization. Here, from a viewpoint of quality maintenance, safety, and the like of the connector, an upper limit value of the operating temperature of the terminal and the like are determined by a predetermined standard. In particular, when the battery is rapidly charged, a large current passes through the connector in a short time, and therefore a degree of a rise in the temperature of the terminal per unit time is higher than that in a case of normal charging. Therefore, there is a possibility that it is difficult to keep the operating temperature of the terminal during the rapid charging within a range defined by the above standard only by natural heat dissipation. On the other hand, it is not desirable to easily assemble a member for heat dissipation (for example, a metal plate or the like) to the outside of the connector because the member can binder miniaturization of the connector and an installation space of the connector in a vehicle both is limited.

SUMMARY

The presently disclosed subject matter provides a connector that suppresses an excessive rise in an operating temperature of a terminal and has an excellent heat dissipation performance.

According to an illustrative aspect of the presently disclosed subject matter, a connector includes a terminal-equipped electric wire having a terminal connected to an end portion of an electric wire, housing configured to accommodate the terminal and to hold the terminal-equipped electric wire and a heat transfer member having elasticity. The housing includes a first housing having a terminal accommodating portion configured to accommodate the terminal, and a second housing configured to hold the terminal-equipped electric wire. The second housing includes a resin holder configured to be externally mounted on an electric wire connection portion of the terminal configured to he connected to the electric wire and the end portion of the electric wire, and a metal holder configured to be externally mounted on the resin holder. The heat transfer member is disposed in a compressed and deformed state between an outer circumferential surface of at least one of the electric wire connection portion of the terminal and the end portion of the electric wire and an inner circumferential surface of the second housing, the heat transfer member contacting in a pressed manner the outer circumferential surface of the at least one of the electric wire connection portion and the end portion of the electric wire and the inner circumferential surface of the second housing.

Other aspects and advantages of the presently disclosed subject matter will be apparent from the following description, the drawings and the claims.

DESCRIPTION OF EMBODIMENTS

Hereinafter, a connector 1 according to an embodiment of the presently disclosed subject matter will be described with reference to the drawings. The connector 1 is a connector that is installed in a vehicle such as a plug-in hybrid vehicle or an electric vehicle and is connected to an electric wire extending from a battery mounted on the vehicle. The connector 1 is also called a charging inlet. By fitting a mating connector (a so-called charging gun) into a fitting recess 63 (see FIG. 1 and the like) of the connector 1, electric power is supplied from the outside of the vehicle to the battery, and the battery is charged.

Figure 1:
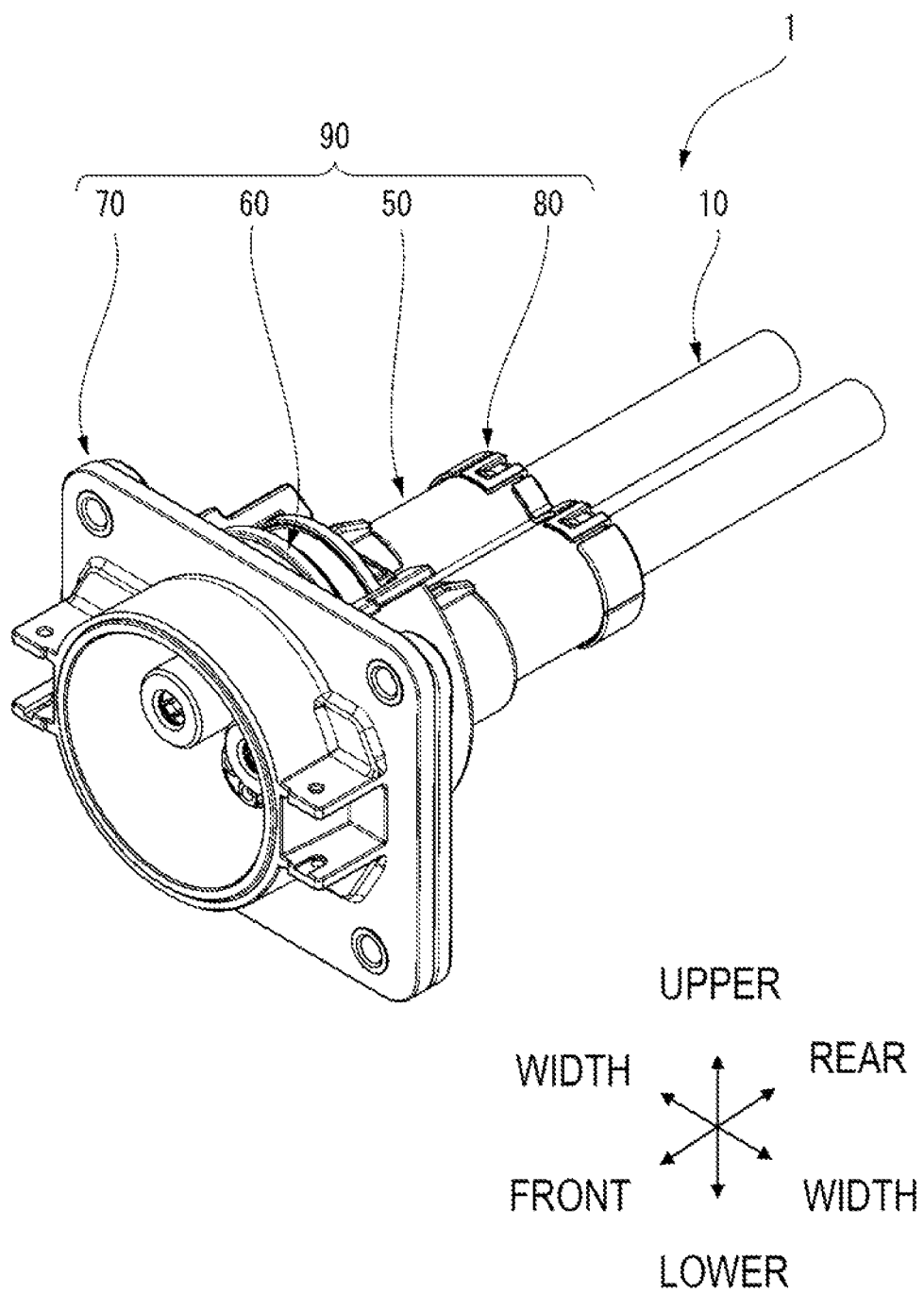
FIG. 1 is a perspective view of a connector according to an embodiment of the presently disclosed subject matter.

Hereinafter, for convenience of description, as illustrated in FIG. 1 and the like, a "front-rear direction", a "width direction", an "upper-lower direction", "upper", "lower", "front", and "rear" directions are defined. The "front-rear direction", the "width direction", and the "upper-lower direction" are orthogonal to each other. The front-rear direction coincides with a fitting direction of the connector 1 and the mating connector (not illustrated), a front side in the fitting direction to side approaching the mating connector) as viewed from the connector 1 is referred to as a "front side", and a release side in the fitting direction (a side away from the mating, connector) as viewed from the connector 1 is referred to as a "rear side".

Figure 5:
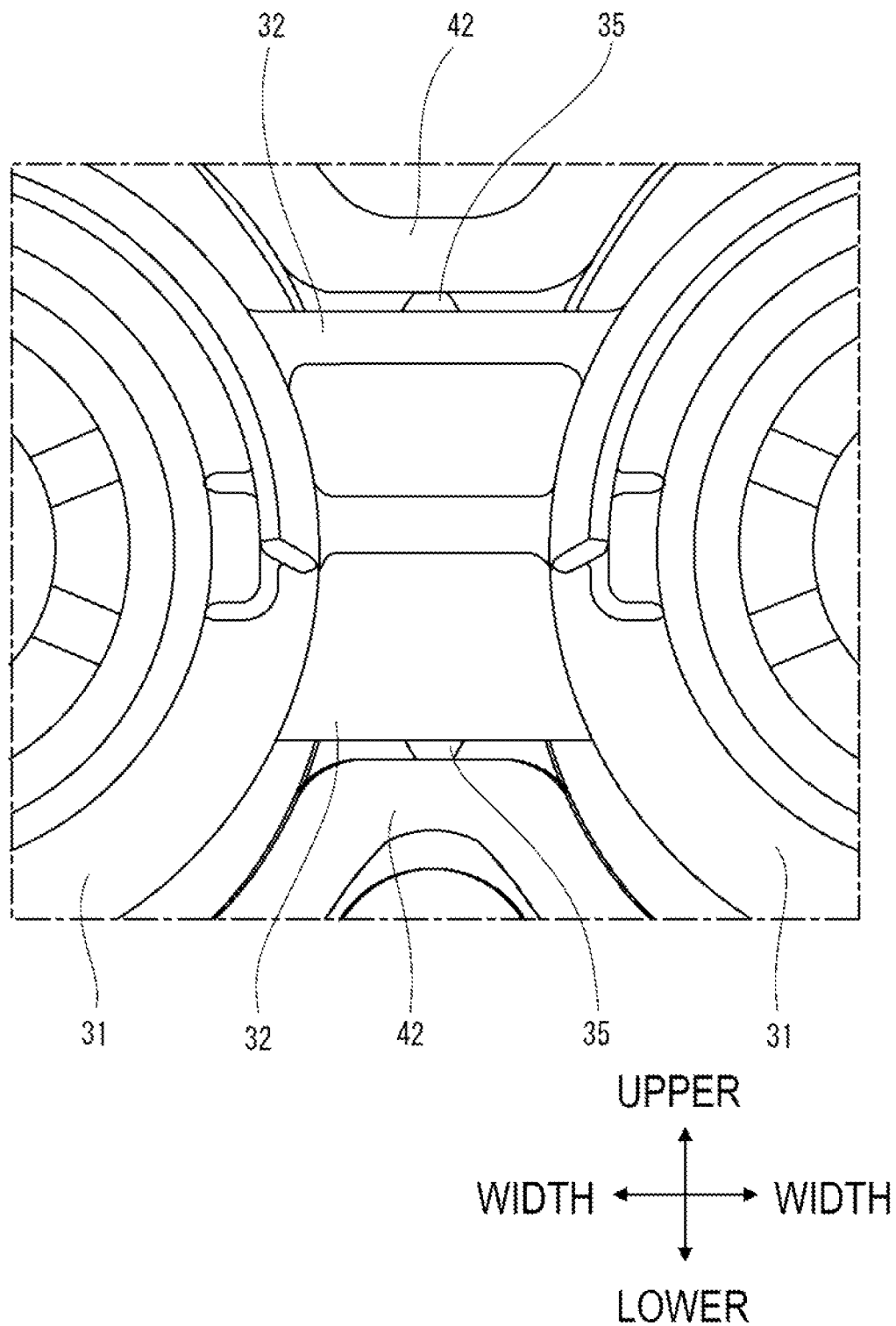
FIG. 5 is an enlarged view of a portion B in FIG. 4.

As illustrated in FIGS. 1 and 5, the connector 1 includes a an of terminal-equipped electric wires 10, and a housing 90 that accommodates terminals 12 of the pair of terminal-equipped electric wires 10 and holds the pair of terminal-equipped electric wires 10. In the pair of terminal-equipped electric wires 10, one end portions 11c of the pair of electric wires 11 are connected to the pair of terminals 12, respectively. The other end portions of the pair of electric wires 11 are connected to a battery (not illustrated). Each of the electric wires 11 includes a conductor core wire 11a and a coating 11b made of an insulating resin and covering the conductor core wire 11a (see FIG. 6). Hereinafter, the components constituting the connector 1 will be described in order.

Figure 6:
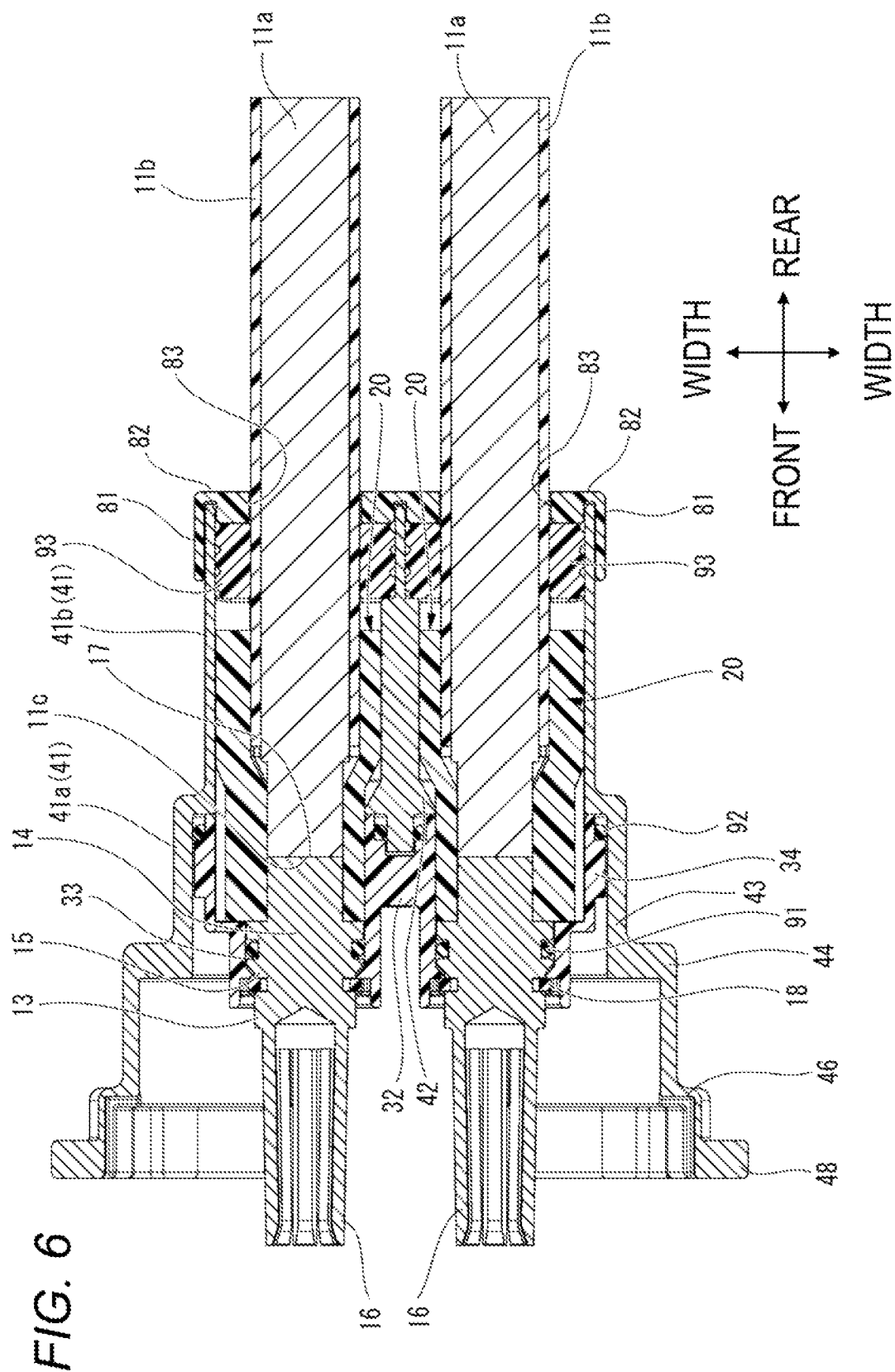
FIG. 6 is a cross-sectional view taken along a line A-A of FIG. 4.

First, the pair of terminals 12 will he described. In the present embodiment, the pair of terminals 12 have the same shape. Each of the pair of terminals 12 is made of metal, and as illustrated in FIG. 6, has a stepped columnar portion including a small diameter portion 13 and a large diameter portion 14 positioned on a rear side of the small diameter portion 13. An annular step portion 15 is formed at a boundary portion between the small diameter portion 13 and the large diameter portion 14 (see FIG. 6). AC-ring 18 is provided in the step portion 15. The pair of terminals 12 are locked to a resin holder 30 by increasing diameters of the C-rings 18 in the resin holder 30, which will be described later.

Each of the small diameter portions 13 is integrally provided with a cylindrical female terminal portion 16 protruding forward from a front end surface of the small diameter portion 13. Of the pair of terminals 12, the female terminal portion 16 of one terminal 12 functions as an anode side terminal, and the female terminal portion 16 of the other terminal 12 functions as a cathode side terminal. At the time of fitting the connector 1 and the mating connector, the female terminal portion 16 of the one terminal 12 and the female terminal portion 16 of the other terminal 12 are respectively connected to a male terminal portion on an anode side and a male terminal portion on a cathode side of the mating connector.

An electric wire connection portion 17 connected to the one end portion 11c of the electric wire 11 is provided at a rear end portion of the large diameter portion 14 (see FIG. 6). Specifically, the conductor core wire 11a exposed at the one end portion 11c of the electric wire 11 is connected to the electric wire connection portion 17. As a result, the terminal 12 and the one end portion 11c of the electric wire 11 are electrically connected to each other.

As illustrated in FIG. 6, an annular groove recessed radially inward is formed on an outer peripheral surface of the large diameter portion 14, and an O-ring 91 is mounted on the annular groove. The pair of terminals 12 have been described above.

Figure 2:
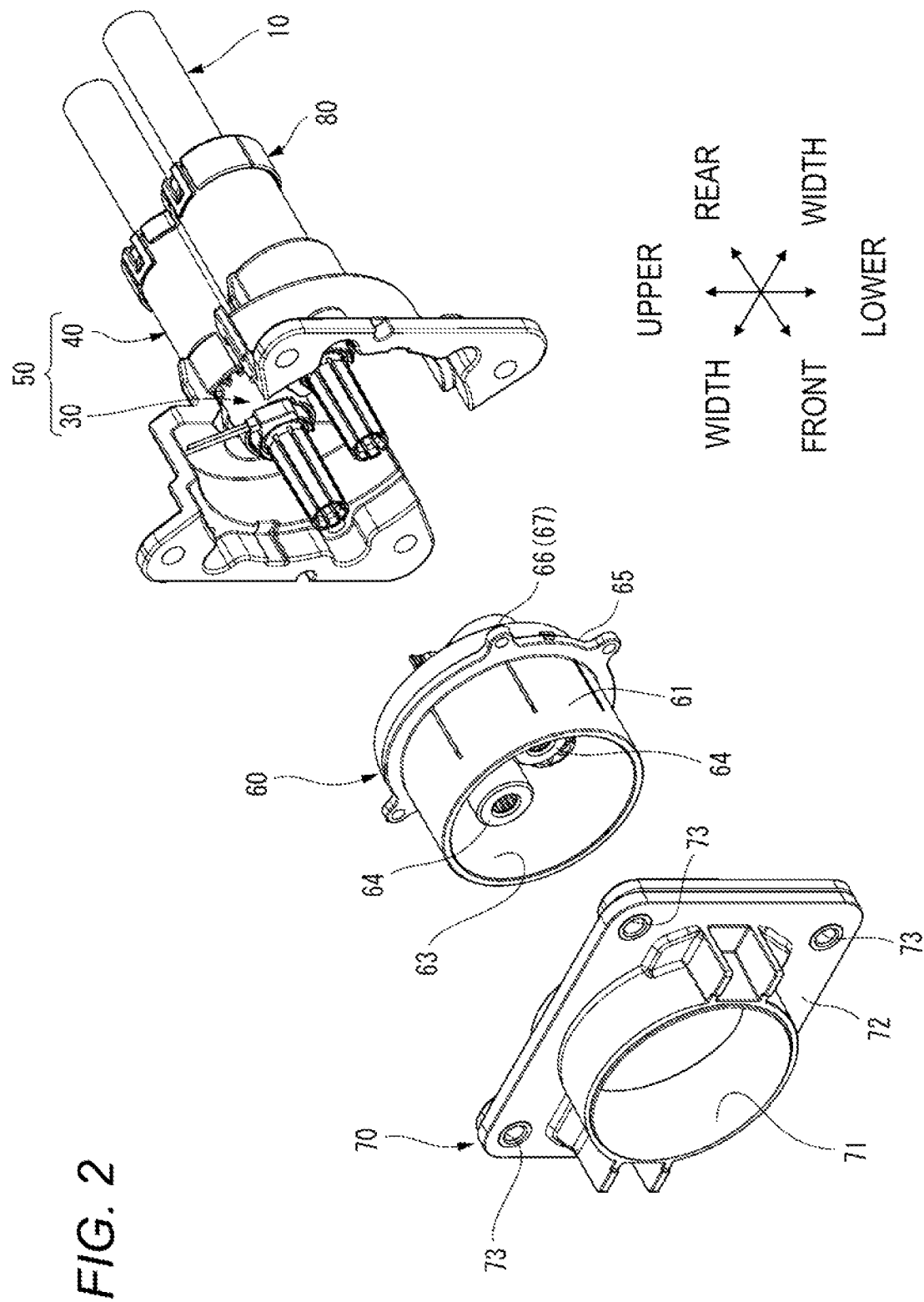
FIG. 2 is an exploded perspective view of the connector illustrated in FIG. 1.

Next, the housing 90 will be described. In the present embodiment, as illustrated in FIGS. 1 and 2, the housing 90 includes a base holder 50, a rear holder 80, an inner housing main body 60, and an outer housing main body 70. Each of the base holder 50, the rear holder 80, the inner housing main body 60, and the outer housing main body 70 is a frame component of the housing 90, and constitutes a part of an outer surface of the housing 90. Hereinafter, the components constituting the housing 90 will be described in order.

Figure 7:
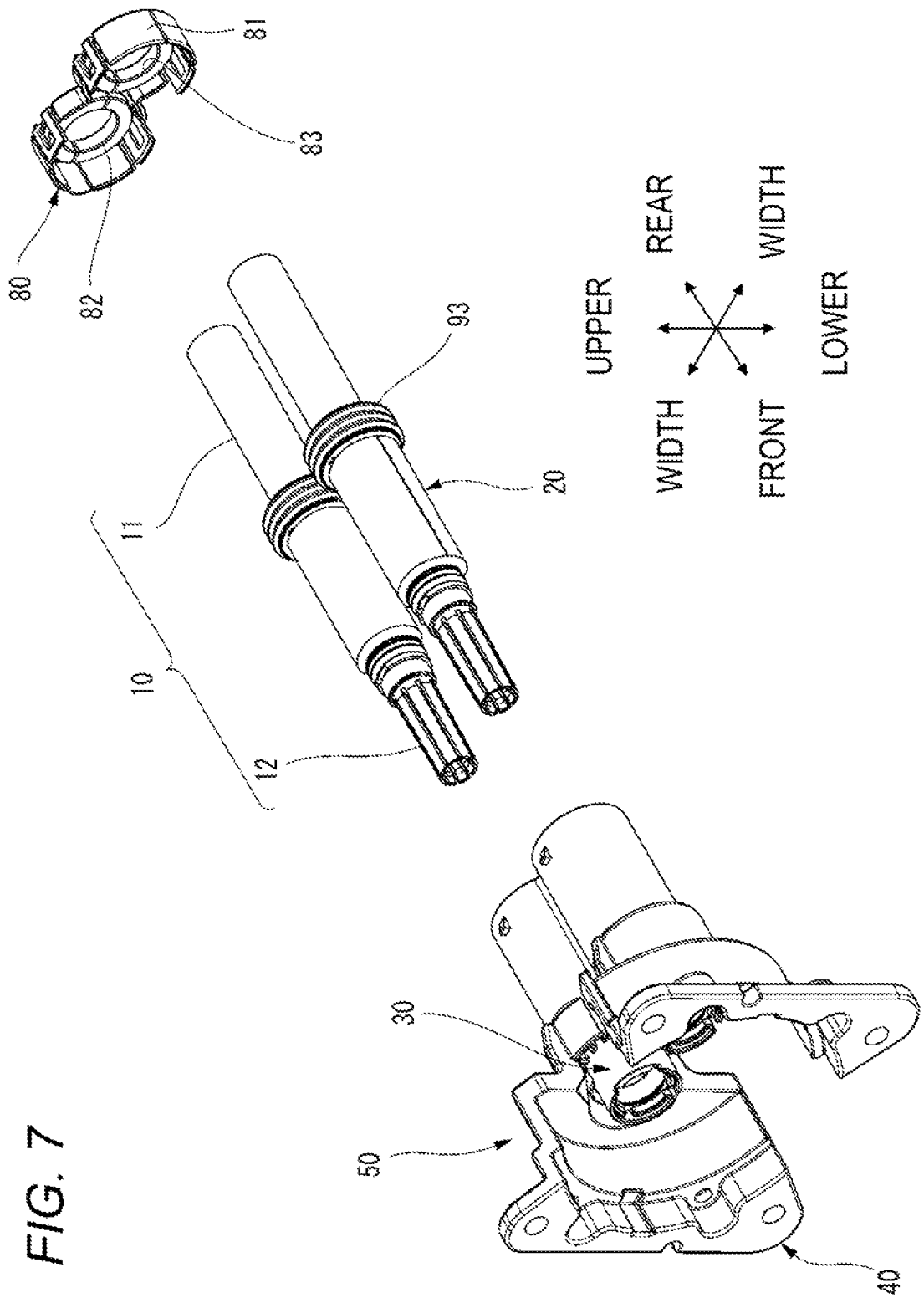
FIG. 7 is an exploded perspective view of the connector illustrated in FIG. 3.
Figure 8:
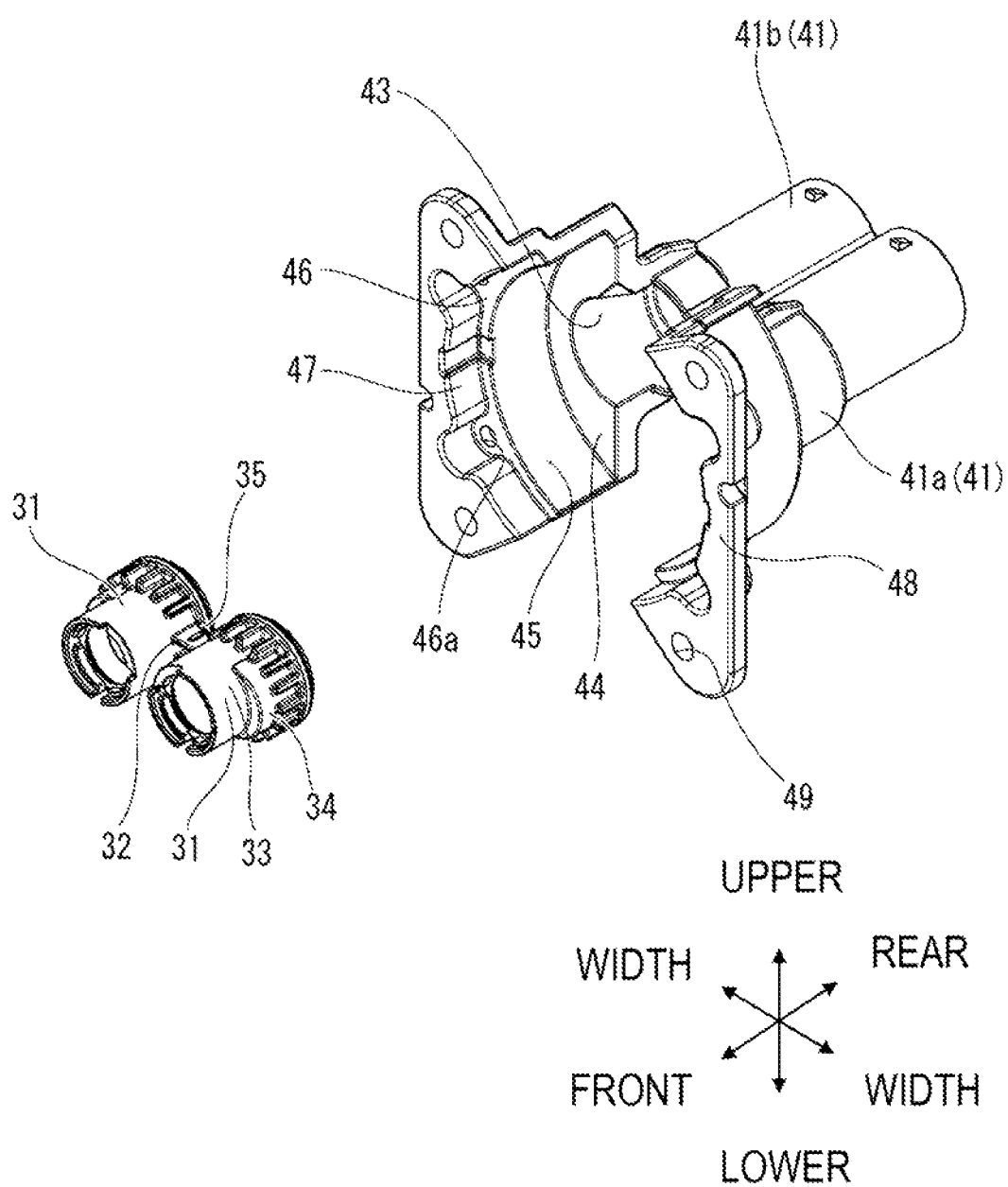
FIG. 8 is an exploded perspective view of a second housing illustrated in FIG. 7.

First, the base holder 50 will he described. The base holder 50 has a function of holding the pair of terminal-equipped electric wire 10 in a state of being insulated from each other at intervals in the width direction. As illustrated in FIGS. 6 to 8, the base holder 50 includes the resin holder 30 which is a resin molded product, and a metal holder 40 which is a metal molded product.

The resin holder 30 has functions of absorbing and dissipating heat generated in the pair of terminals 12 and insulation and protecting the pair of terminals 12. In particular, as illustrated in FIG. 8, the resin holder 30 integrally includes a pair of terminal holding portions 31 aligned in the width direction and a connecting portion 32 connecting the pair of terminal holding portions 31 in the width direction. As illustrated in FIGS. 6 and 8, each of the terminal holding portions 31 has a stepped cylindrical shape extending in the front-rear direction, which includes a small diameter portion 33 and a large diameter portion 34. In the resin holder 30, a cross section of the small diameter portion 33 cut along the upper-lower direction and the width direction has a substantially perfect circular shape, and a cross section of the large diameter portion 34 cut along the upper-lower direction and the width direction has a substantially elliptical shape.

As illustrated in FIG. 6, a heat transfer member 20, which will be described later, is disposed inside each large diameter portion 34. An annular groove recessed radially inward is formed on an outer peripheral surface of a rear end portion of the large diameter portion 34, and an O-ring 92 is mounted on the annular groove.

The connecting portion 32 connects the large diameter portions 34 of the pair of terminal holding portions 31. The pair of terminals 12 are inserted into the pair of terminal holding portions 31 from the rear side (see also FIG. 8). A protrusion portion 35 protruding upward is provided on an outer peripheral surface on an upper side of the connecting portion 32, and a protrusion portion 35 protruding downward is provided on an outer peripheral surface on a lower side of the connecting portion 32. The protrusion portions 35 have a function of preventing the resin holder 30 from falling off the metal holder 40.

The metal holder 40 is assembled to the resin holder 30 from the rear side, and has a function of absorbing and dissipating heat generated in the pair of terminals 12. As illustrated in FIG. 8, the metal bolder 40 integrally includes a pair of tubular portions 41 aligned in the width direction and connecting portions 42 connecting the pair of tubular portions 41 in the width direction.

Figure 9:
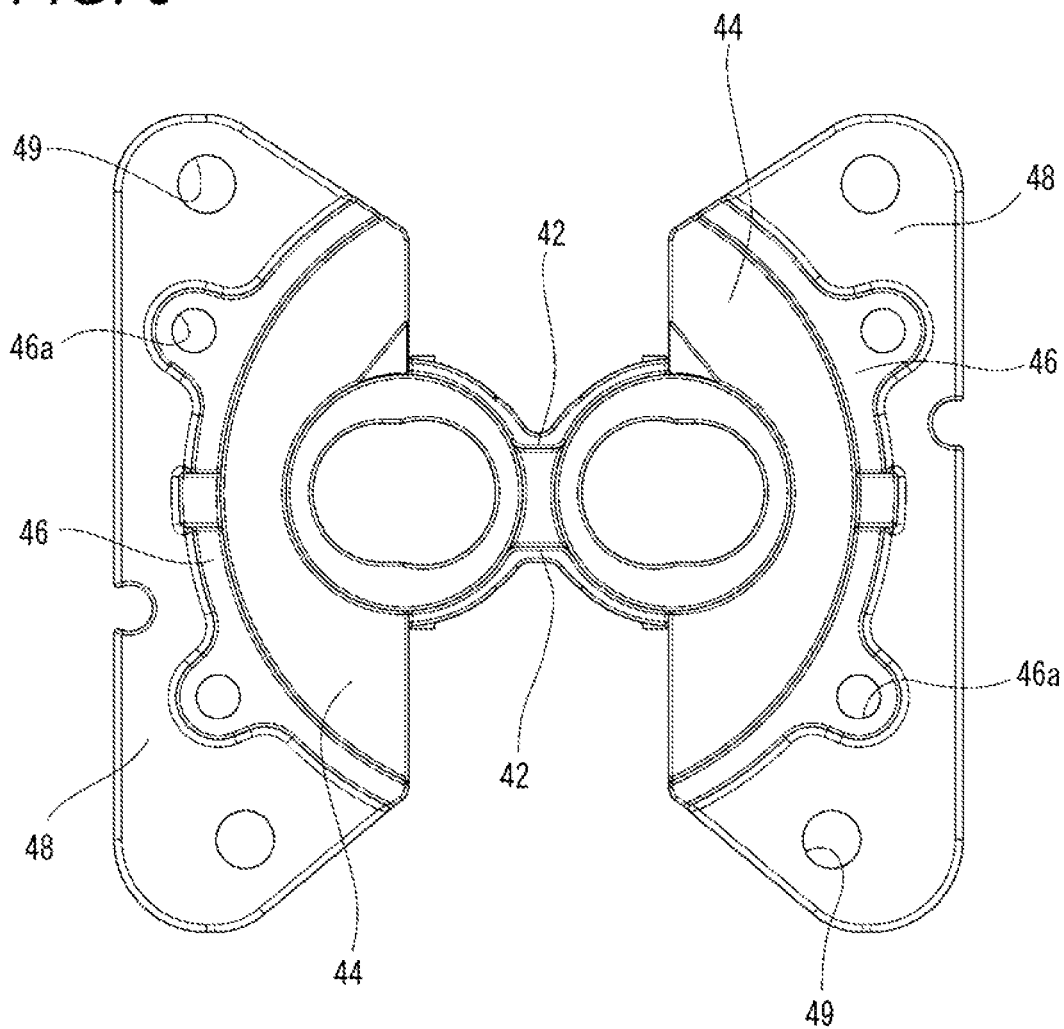
FIG. 9 is a front view of a metal holder illustrated in FIG. 8.
Figure 9:
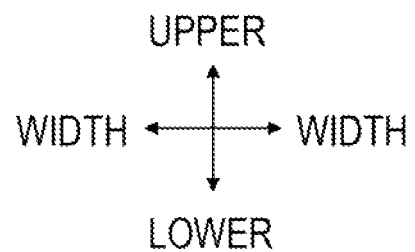

As illustrated in FIGS. 6 and 8, the tubular portion 41 has a stepped cylindrical shape extending in the front-rear direction, which includes a small diameter portion 41b and a large diameter portion 41a. As illustrated in FIG. 9, in the metal holder 40, a tubular hole of the tubular portion 41 has a substantially elliptical shape. In other words, the metal holder 40 has a substantially elliptical inner peripheral shape.

A front end portion of the large diameter portion 41a is integrally provided with a pair of first side wall portions 43 extending forward from both end portions of the front end portion of the large diameter portion 41a in the width direction. The pair of first side wall portions 43 have an outer peripheral shape corresponding to an outer peripheral shape formed by the pair of large diameter portions 34 and the connecting portion 32 of the resin holder 30, and can be attached to the resin holder 30 so as to cover the outer peripheral surfaces of the pair of large diameter portions 34 and the connecting portion 32.

Front end portions of the pair of first side wall portions 43 are integrally provided with a pair of first extending portions 44 extending outward in the width direction from the front end portions of the pair of first side wall portions 43 and a pair of second side wall portions 45 extending forward from extending end portions of the pair of first extending portions 44. The pair of second wall portions 45 have an outer peripheral shape corresponding to an outer peripheral shape of a tubular portion 61 of the inner housing main body 60, which will be described later.

Front end portions of the pair of second side wall portions 45 are integrally provided with a pair of second extending portions 46 extending outward in the width direction from the front end portions of the pair of second side wall portions 45 and a pair of third side wall portions 47 extending forward from the extending end portions of the pair of second extending portions 46. Bolt insertion holes 46a penetrating in the front-rear direction are formed at a plurality of locations (four locations in the present embodiment) in the pair or second extending portions 46. Bolts (not illustrated) for assembling the housing 90 are inserted into the bolt insertion holes 46a.

Front end portions of the pair of third side wall portions 47 are integrally provided with flange portions 48 that extend outward in the width direction from the front end portions of the pair of third side wall portions 47. Bolt insertion holes 49 penetrating in the front-rear direction are formed at a plurality of locations (four locations in the present embodiment) in the flange portions 48. Bolts (not illustrated) for fixing the connector 1 to an attachment target portion of the connector 1 are inserted into the bolt insertion holes 49.

Next, the rear holder 80 will he described. The rear holder 60 is assembled to the base holder 50 from the rear side and has a function of holding the pair of terminal-equipped electric wires 10 in a state of being spaced apart from each other in the width direction. The rear holder 80 is a resin molded product and integrally includes a tubular portion 81 extending in the front-rear direction and a rear wall portion 82 closing a rear opening of the tubular portion 61.

The tubular portion 81 has an outer peripheral shape corresponding to outer peripheral shapes of the pair of tubular portions 41 (specifically, the small diameter portion 41b) of the metal holder 40, and can be mounted to a rear end portion of the metal holder 40 (that is, the base holder 50) so as to cover outer peripheral surfaces of the rear end portions of the pair of tubular portions 41. The rear wall portion 82 is provided with a pair of electric wire insertion holes 83 that are arranged in the width direction and penetrate in the front-rear direction, corresponding to the pair of tubular portions 41. The pair of electric wires 11 are inserted into the pair of electric wire insertion holes 83 (see FIG. 6).

Next, the inner housing main body 60 will be described. The inner housing main body 60 is assembled from the front side to the pair of second side wall portions 45 of the metal holder 40, and also functions as the fitting recess 63 (see also FIG. 1) of the connector 1. The inner housing main body 60 is a resin molded product, and integrally includes a tubular portion 61 having a cylindrical shape and extending in the front-rear direction, and a rear wall portion (not illustrated) closing a rear opening of the tubular portion 61. The tubular portion 61 and the rear wall portion define the fitting recess 63 that is open forward and is recessed rearward.

A pair of cylindrical female terminal accommodating portions 64 are provided on the rear wall portion so as to protrude forward, corresponding to the female terminal portions 16 of the pair of terminals 12 (see FIGS. 1 and 2). Each of the female terminal accommodating portions 64 is positioned in the fitting recess 63 and has an internal space penetrating in the front-rear direction.

As illustrated in FIG. 2, an annular flange portion 65 protruding outward in a radial direction of the tubular portion 61 is provided at a position on the rear side of a center of an outer peripheral surface of the tubular portion 61 in the front-rear direction. The flange portion 65 is provided with bolt insertion portions 66 at a plurality of locations (four locations in the present embodiment) in the peripheral direction corresponding to the bolt insertion boles 46a of the second extending portions 46 of the metal holder 40. A bolt insertion hole 67 penetrating in the front-rear direction is formed in each of the bolt insertion portions 66. A bolt (not illustrated) for assembling the housing 90 is inserted into the bolt insertion hole 67.

Next, the outer housing main body 70 will be described. The outer housing main body 70 is assembled to the tubular portion 61 of the inner housing main body 60 from the front side, and has a inaction of fixing the entire housing 90 to the attachment target portion (not illustrated) of the connector 1 provided in the vehicle. The outer housing main body 70 is a resin molded product, and has a tubular portion 71 having a cylindrical shape and extending in the front-rear direction. The tubular portion 71 can be attached to the tubular portion 61 from the front side so as to cover the outer peripheral surface of the tubular portion 61 of the inner housing main body 60.

An annular flange portion 72 protruding outward in a radial direction of the tubular portion 71 is provided at a position on the rear side of a center of an outer peripheral surface of the tubular portion 71 in the front-rear direction. The flange portion 72 has a rectangular outer peripheral shape as viewed in the front-rear direction. Bolt insertion holes 73 penetrating in the from-rear direction are formed in four corner portions of the flange portion 72, corresponding to the bolt insertion holes 49 of the flange portion 4 of the metal holder 40, respectively. Bolts (not illustrated) for fixing the connector 1 to the attachment target portion of the connector 1 are inserted into the bolt insertion holes 73. The components constituting the frame component of the housing 90 have been described above.

Figure 11:
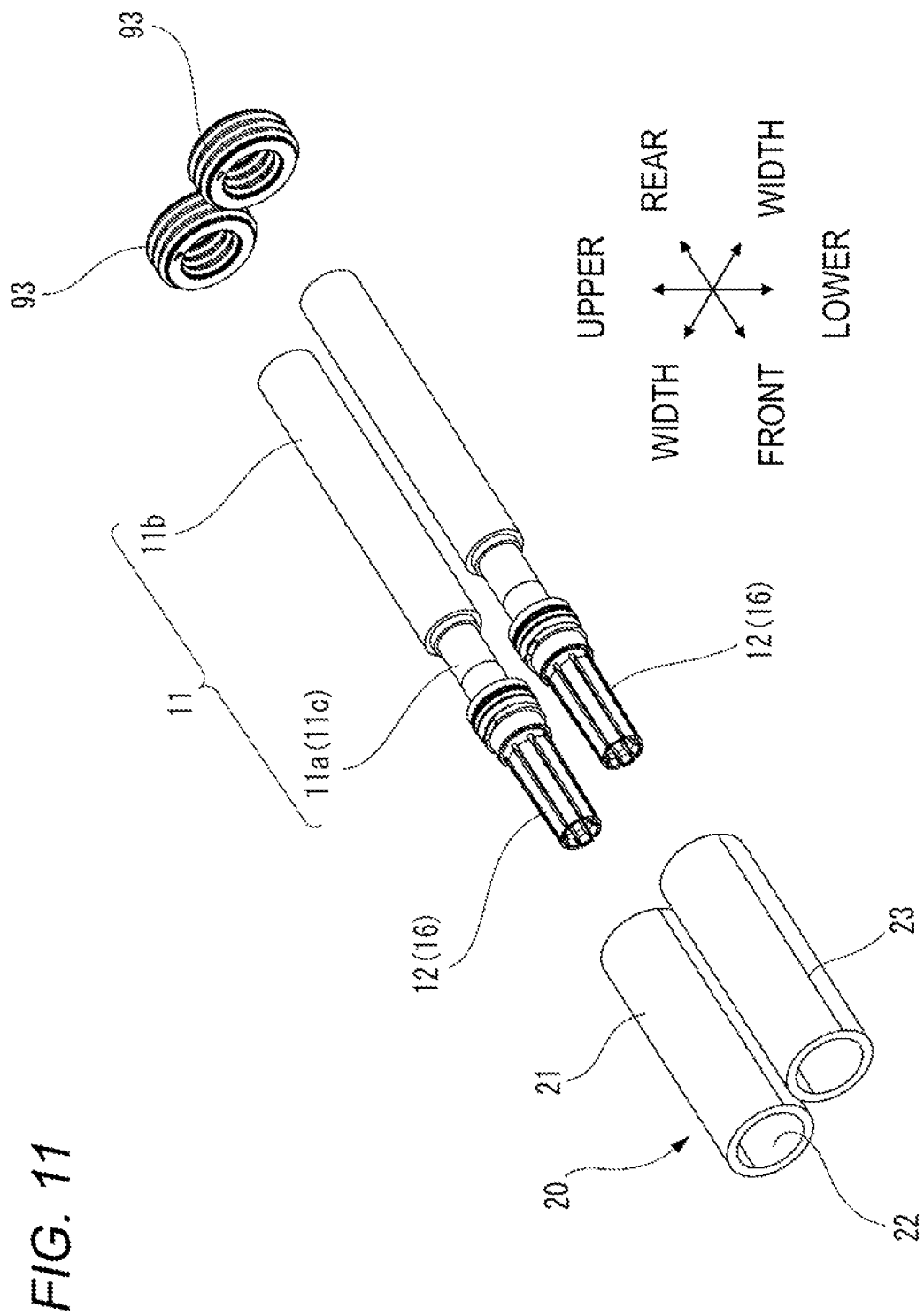
FIG. 11 is an exploded perspective view of the terminal-equipped electric wire to which the heat transfer member illustrated in FIG. 7 is externally mounted.

Next, the pair of heat transfer members 20 will be described. Each heat transfer member 20 is made of a material that as elasticity and an insulating property and is excellent in a heat transfer property, and has a functions of transferring heat from the terminal 12 to the base holder 50. As illustrated in FIGS. 7 and 11 (in particular, FIG. 11), each heat transfer member 20 includes a tubular portion 21 having a substantially cylindrical and extending in the front-rear direction, and a tubular hole 22 penetrating in the front-rear direction. Slits 23 extending in the front-rear direction are provided on an outer peripheral surface and an inner peripheral surface of the tubular portion 21.

Figure 10:
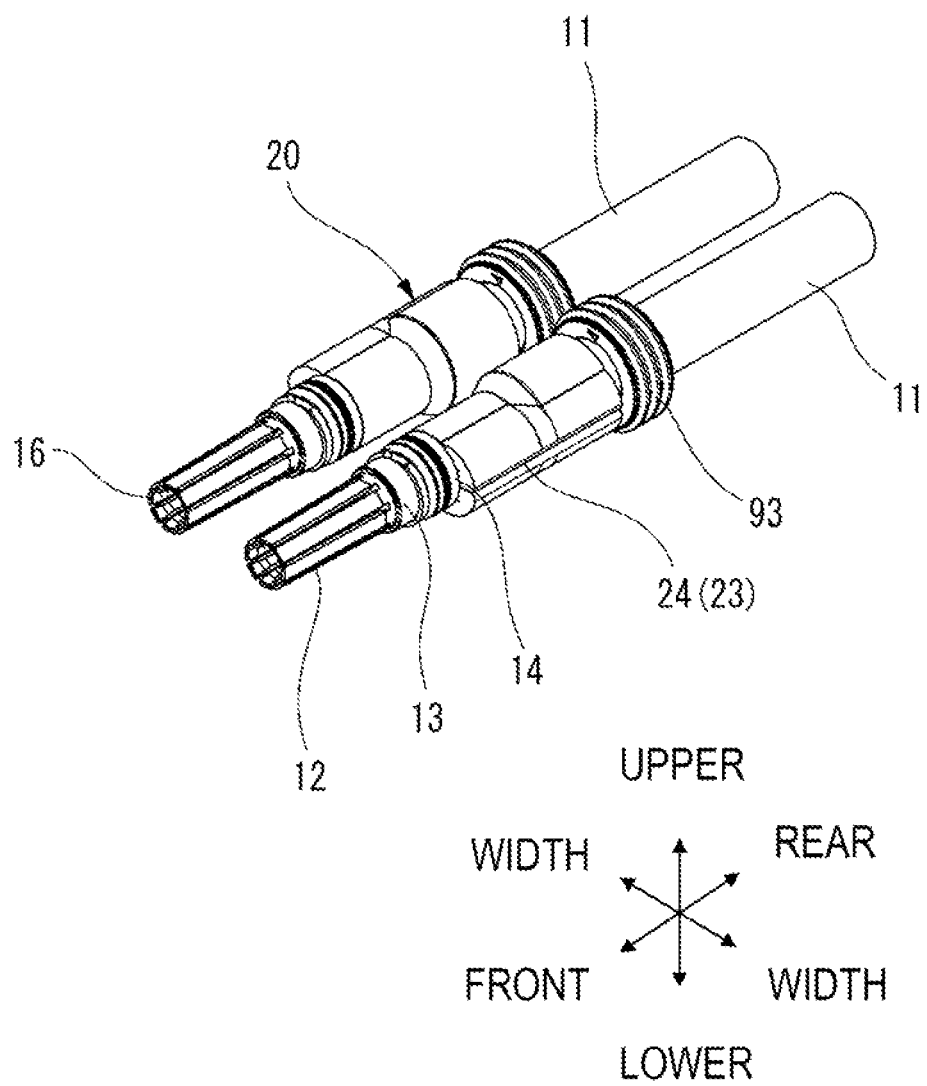
FIG. 10 is a view corresponding to a terminal-equipped electric wire to which a heat transfer member illustrated in FIG. 7 is externally mounted, and is a perspective view illustrating a state in which the heat transfer member is compressed and deformed.

Compression and deformation of the heat transfer member 20 is assisted by the slits 23. Specifically, as illustrated in FIG. 10, when the heat transfer member 20 is compressed and deformed, portions of the tubular portion 21 thin sandwich the slits 23 in the peripheral direction are folded back so as to slip into cuts of the slits 23 with the slits 23 as a base point. Thus, a folded-back portion 24 is formed in the tubular portion 21 (this point will be described later). The heat transfer member 20 has been described above.

Next, a procedure for assembling the connector 1 will be described. First, the metal holder 40 is mounted to the resin holder 30. Therefore, the metal holder 40 is attached to the resin holder 30 from the rear side so that the pair of first side wall portions 43 thereof cover the outer peripheral surfaces of the pair of large diameter portions 34 and the connecting portion 32 of the resin holder 30 (see FIGS. 6 and 7). In this way; the base holder 50 is obtained by mounting the metal holder 40 to the resin holder 30. As preparation for mounting the metal holder 40 to the resin holder 30, the rubber O-ring 92 is mounted to each of the annular grooves of the pair of large diameter portions 34 of the resin holder 30.

In a state where the mounting is completed, as illustrated in FIG. 5, the protrusion portions 35 of the resin holder 30 are pressed into contact with the connecting portions 42 of the metal holder 40. Specifically, the protrusion portion 35 on the upper side presses the connecting portion 42 on the upper side upward, and the protrusion portion 35 on the lower side presses the connecting portion 42 on the lower side downward. This prevents the resin holder 30 from falling off from the metal holder 40.

In a state where the metal holder 40 is completely mounted on the resin holder 30, as illustrated in FIG. 6, the O-rings 92 are pressed and held between an outer peripheral surface of the resin holder 30 and an inner peripheral surface (specifically, the first side wall portions 43) of the metal holder 40.

Before or after mounting of the metal holder 40 to the resin holder 30, the pair of heat transfer members 20 are mounted to the pair of terminal-equipped electric wires 10 to which the pair of terminals 12 are connected to the one end portions 11c of the pair of electric wires 11. Therefore, as illustrated in FIG. 11, the pair of heat transfer members 20 are mounted so as to be in close contact with the electric wire connection portions 17 of the terminals 12 and the one end portions 11c of the electric wires 11 in the pair of terminal-equipped electric wires 10 from the front side (see also FIG. 7). The pair of heat transfer members 20 are mounted so that the conductor core wires 11a of the pair of electric wires 11 are not exposed. The pair of heat transfer members 20 may be mounted to the pair of terminal-equipped electric wires 10 from the rear side, as long as the pair of heat transfer member 20 are in close contact with connection portions between the terminals 12 and the electric wires 11.

In a state where the mounting of the pair of heat transfer members 20 to the pair of terminal-equipped electric wires 10 is completed, since each of the heat transfer members 20 has the elasticity, the heat transfer member is in close contact with the terminal-equipped electric wire 10 corresponding to a stepped shape of outer surfaces of the connection portion between the terminal 12 and the electric wire 11 and the coating 11b of the electric wire 11.

When the mounting of the metal holder 40 to the resin holder 30 is completed and the mounting of the pair of heat transfer members 20 to the pair of terminal-equipped electric wires 10 is completed, the pair of terminals 12 of the pair of terminal-equipped electric wires 10 are then inserted into the base holder 50. For this reason, as preparation thereof, as illustrated in FIGS. 7 and 11, the coatings 11b of the pair of electric wires 11 of the pair of terminal-equipped electric wires 10 are inserted into the pair of electric wire insertion holes 83 of the rear holder 80 from the front side, and then annular rubber packings 93 are inserted into the coatings lib of the pair of electric wires from the front side so as to be adjacent to the front side of the rear wall portion of the rear holder 80, respectively. Further, the O-rings 91 (see FIG. 6) made of rubber are mounted to the annular grooves of the pair of terminals 12.

Next, the pair of terminals 12 are inserted into the pair of terminal holding portions 31 of the resin holder 30 in the base holder 50 from the rear side. This insertion is continued until the small diameter portions 13 and the female terminal portions 16 of the pair of terminals 12 protrude forward from the front ends of the pair of terminal holding portions 31 and the pair of terminals 12 are locked to inner peripheral surfaces of the pair of terminal holding portions 31 by the C-rings 18. In a state where the insertion is completed (that is, a state where the insertion of the pair of terminal-equipped electric wires 10 into the base holder 50 is completed), as illustrated in FIG. 6, the O-rings 91 attached to the terminals 12 are respectively pressed into contact with the inner peripheral surfaces of the small diameter portions 33 of the terminal holding portions 31.

During the insertion of the pair of terminal-equipped electric wires 10 into the base holder 50, the heat transfer members 20 are pressed against the inner peripheral surface of the base holder 50 and deformed to be compressed. At this time, the heat transfer member 20 is folded back so that the portions of the tubular portion 21 that sandwich the slits 23 in the peripheral direction slip into the cuts of the slits 23 with the slits 23 as a base point. As a result, the folded-back portion 24 is formed at, a portion where the slits 23 of the tubular portion 21 are provided (See FIG. 10). When the insertion of the pair of terminal-equipped electric wires 10 into the base holder 50 is completed, the heat transfer members 20 are pressed into contact with both the outer peripheral surfaces of the terminal-equipped electric wires 10 and the inner peripheral surface of the base holder 50 (in particular, the metal holder 40), In other words, the heat transfer members 20 are disposed in a compressed and deformed state so as to be in close contact between outer peripheral surfaces of the electric wire connection portions 17 of the terminals 12 and the one end portions 11c of the electric wires 11 and the inner peripheral surface of the base holder 50 (the resin holder 30), respectively.

Figure 3:
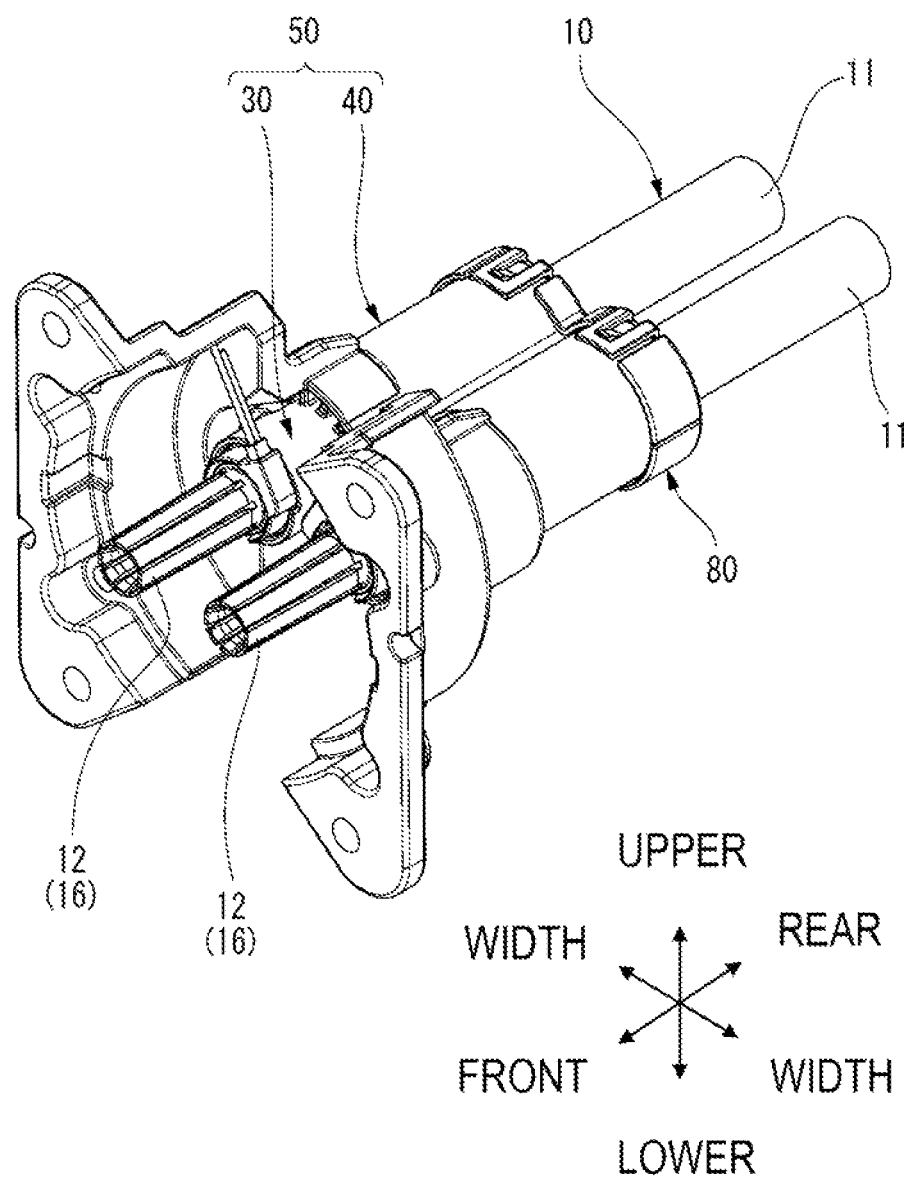
FIG. 3 is a perspective view of the connector excluding an outer housing main body and an inner housing main body illustrated in FIG. 2.
Figure 4:
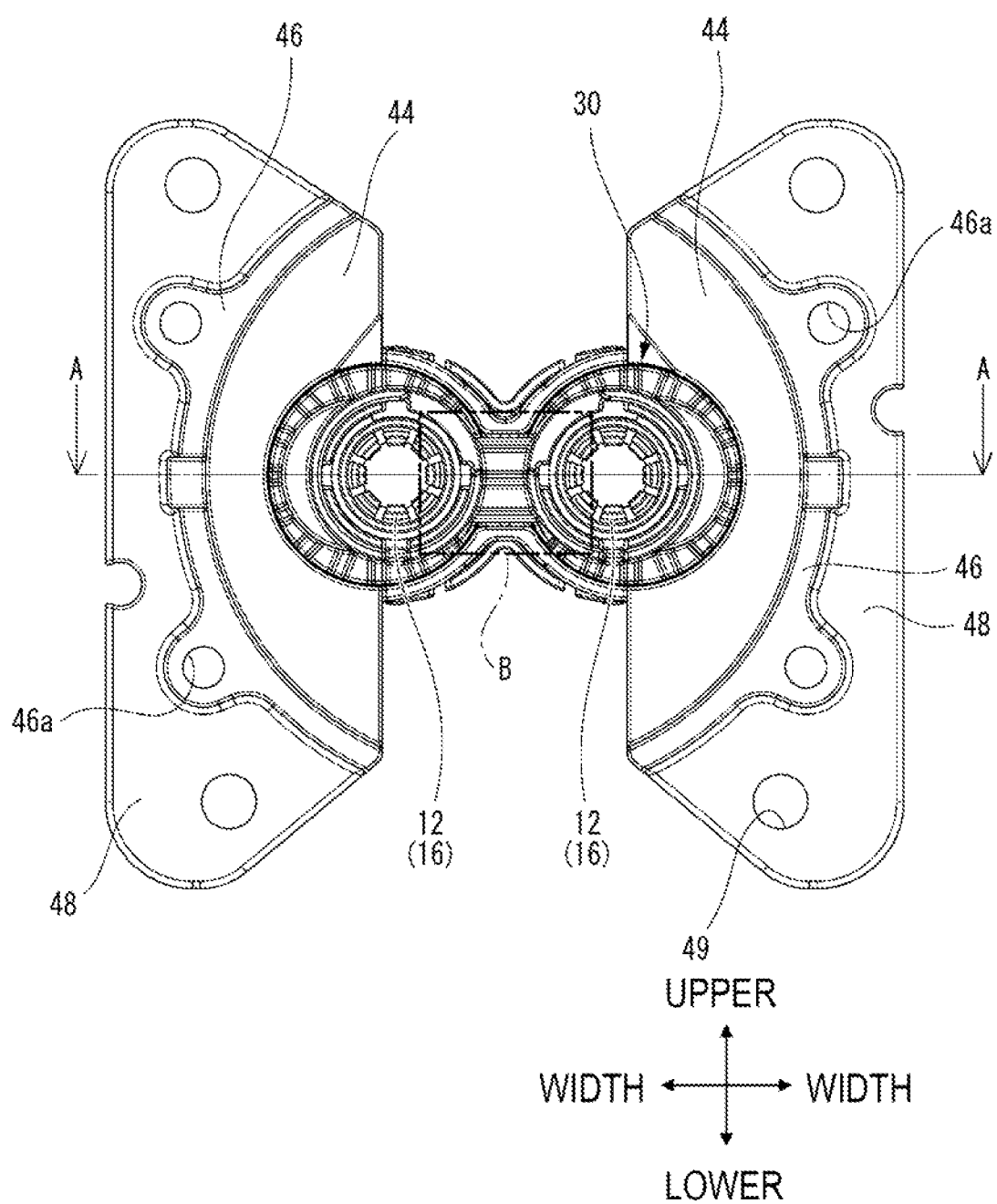
FIG. 4 is a front view of the connector illustrated in FIG. 3.

When the insertion of the pair of terminals 12 into the base holder 50 is completed, the rear holder 80 is then attached to the base holder 50. Therefore, by pressing the rear holder 80 toward the front side and moving the pair of packings 93 positioned an the front side of the rear holder 80 and the rear holder 80 to the front side with respect to the pair of electric wires 11, the tubular portions 81 of the rear holder 80 are attached to a rear end portion of the base holder 50 (specifically, the metal holder 40) (see FIGS. 2 to 3 and 6).

In a state where the rear holder 80 is completely mounted on the base holder 50, as illustrated in FIG. 6, each packing 93 is pressed and held between the inner peripheral surface of the metal holder 40 of the base holder 50 and the outer peripheral surface of the electric wire 11 (the coating 11b). As a result, due to a water stopping function of the pair of O-rings 91, the pair of O-rings 92, and the pair of packings 93, entry of water into internal spaces of the pair of terminal holding portions 31 (specifically, the connection portions between the terminals 12 and the electric wires 11) from the outside is suppressed. Further, the pair of terminals 12 are held by the resin holder 30 of the base holder 50 in a state of being insulated from each other at intervals in the width direction, and the pair of electric wires 11 extending rearward from the pair of terminals 12 are held by the rear holder 80 in a state of being spaced apart from each other in the width direction.

When the mounting of the rear holder 130 to the base holder 50 is completed, the outer housing main body 70 is then mounted to the inner housing main body 60 (see FIG. 1). Therefore, the outer housing main body 70 is mounted to the inner housing main body 60 from the front side so that the tubular portion 71 of the outer housing main body 70 covers the outer peripheral surface of the tubular portion 61 of the inner housing main body 60. In a state where the mounting is completed, a rear end surface of the tubular portion 71 of the outer housing, main body 70 is in contact with a front end surface of the flange portion 65 of the inner housing main body 60.

When the mounting of the outer housing main body 70 to the inner housing main body 60 is completed, a plurality of (four in the present embodiment) bolts (not illustrated) are then inserted into the plurality of bolt insertion holes 46a of the base holder 50 and the plurality of bolt insertion holes 67 of the inner housing main body 60 from the rear side, and fastened to a plurality of fastening positions (not illustrated) provided in the outer housing main body 70, as illustrated in FIG. 2. Accordingly, the base holder 50 and the inner housing main body 60 are fastened to the outer housing main body 70, so that the base holder 50, the rear holder 80, the inner housing main body 60, and the outer housing main body 70 constituting the frame component of the housing 90 are integrated. As a result, the assembly of the connector 1 is completed, and the connector 1 illustrated in FIG. 1 is obtained.

The connector 1 for which the assembly has been completed is fastened and fixed to the attachment target portion (not illustrated) of the connector 1 provided in the vehicle by using a plurality of (four in the present embodiment) bolts (not illustrated) inserted into the bolt insertion holes 49 of the metal holder 40 in the base holder 50 and the plurality of bolt insertion holes 73 of the outer housing main body 70.

When the battery (not illustrated) mounted on the vehicle is charged, a mating connector (so-called charging gun) is fitted into the exposed fitting recess 63 of the connector 1 fixed to the attachment target portion of the vehicle. As a result, electric power is supplied to the battery from the outside of the vehicle via the mating connector, the connector 1, and the pair of terminal-equipped electric wires 10 in tins order, and the battery is charged.

Next, the operation of providing the base holder 50 including the resin holder 30 and the metal holder 40 and the heat transr member 20 to the connector 1 will be described. As described above, when the battery is charged using the connector 1, the temperatures of the pair of terminals 12 in the connector 1 rise due to Joule heat caused by the energization. In particular, when the battery is rapidly charged, a large current passes through the pair of terminals 12 in a short time, and therefore a degree of a rise in the temperatures of the pair of terminals 12 per unit time is likely to increase.

In this regard, in the present embodiment, the heat generated in the terminal 12 is mainly transmitted to the resin holder 30 via the heat transfer member 20, and is absorbed by the metal holder 40. In addition, the heat generated in the terminal 12 is transmitted to and absorbed by the metal holder 40 via the heat transfer member 20. Further, the heat transmitted to the metal holder 40 is transmitted to and absorbed by the attachment target portion (not illustrated) of the connector 1 provided in the vehicle via the bolts (not illustrated) inserted through the flange portion 48 and the bolt insertion hole 49 of the metal holder 40. The heat absorbed by the base holder 50 (particularly, the metal holder 40) and the attachment target portion are respectively dissipated to the outside through the outer surface (the surface exposed to the outside) of the base holder 50 and the outer surface of the attachment target portion. As a result, the rise in the temperature of the terminal 12 is suppressed.

The base holder 50 includes the resin holder 30 and the metal holder 40. In general, when a metal member and a resin member are compared in the same volume, a heat capacity of the metal member is larger than a heat capacity of the resin member due to the fact that a density of the metal is higher than a density of the resin. On the other hand, the terminal 12, the electric wire connection portion 17 of the terminal 12 and the one end portion 11c of the electric wire 11 must be insulated and protected. Therefore, the resin holder 30 is externally mounted to the terminal-equipped electric wire 10 so as to hold the terminal 12 and cover the connection portion between the terminal 12 and the electric wire 11, and the metal holder 40 is externally mounted to the resin holder 30.

Accordingly, the base holder 50 can insulate and protect the terminal 12, the electric wire connection portion 17 of the terminal 12 and the one end portion 11c of the electric wire 11 while maintaining an excellent heat capacity. From a viewpoint of a beat dissipation performance, the material constituting the metal holder 40 is not necessarily limited to metal, and may be another material as long as it has an appropriate heat capacity, in addition, from a viewpoint of insulation protection, the material constituting the resin holder 30 is not necessarily limited to resin, and may be other materials as long as the terminal 12, the electric wire connection portion 17 of the terminal 12 and the one end portion 11c of the electric wire 11 can be insulated and protected. From the viewpoint of the insulation protection, an insulating coating agent that does not impair the heat capacity may be applied to the metal holder 40.

The larger the heat capacity of the metal holder 40, the slower the rise in the temperature of the metal holder 40 that absorbs heat generated in the terminal 12. Therefore, for example, even when the joule heat generated in the terminal 12 is large as in the case of the rapid charging, the temperature of the metal holder 40 can slowly rise by using the metal holder 40 having a large heat capacity, and as a result, the temperature of the terminal 12 can also slowly rise.

Noted that the temperature of the metal holder 40 raised by the rapid charging decreases due to natural heat dissipation after the rapid charging is finished. At this time, as the heat capacity of the metal holder 40 becomes larger, the temperature of the metal holder 40 slowly decreases (that is, a relatively long time is required until the temperature of the metal holder 40 returns to a normal temperature). However, it is unlikely that the connector 1 is not used for any purpose other than the charging of the battery, and the rapid charging is started again after a short period of time after the completion of the rapid charging. Therefore, even if the temperature of the metal holder 40 after the completion of the rapid charging slowly decreases (even if a relatively long time is required until the temperature of the metal holder 40 returns to the normal temperature), there is no problem in light of the function of the connector 1.

According to the connector 1 of the present embodiment, the heat transfer member 20 is disposed in the compressed and deformed state so as to be in close contact between the outer peripheral surface of the electric wire connection portion 1 of the terminal 12 and the one end portion 11c of the electric wire 11 and the inner peripheral surface of the base holder 50, so that the heat generated in the terminal 12 at the time of energisation can be absorbed by the heat transfer member 20 having a large heat capacity. Accordingly, even when a heat generation amount of the terminal 12 per unit time is large as in the case of the rapid charging, the heat transfer member 20 can suppress a rapid rise in the operating temperature of the terminal 2, and can make the operating temperature of the terminal 12 slowly rise. The base holder 50 further includes the resin holder 30 that is externally mounted on the electric wire connection portion 17 of the terminal 12 and the one end portion 11c of the electric wire 11, and the metal holder 40 that is externally mounted on the resin holder 30. As a result, the connection portion between the terminal 12 and the electric wire 11 is insulated and protected from the metal holder 40 by the resin holder 30. The beat absorbed by the heat transfer member 20 is efficiently transferred from the inside to the outside of the connector 1.

According to the connector 1 of the present embodiment, since the inner peripheral shape of the metal holder 40 has the substantially elliptical shape, the compression and deformation of the heat transfer member 20 having a substantially cylindrical shape can be adjusted to an appropriate state. Specifically, since the heat transfer member 20 is attached to the terminal-equipped electric wire 10 having the stepped shape of the connection portion between the terminal 12 and the electric wire 11 and the coating 11b of the electric wire 1 on the outer surface, the compression and deformation of the heat transfer member 20 does not mean that the heat transfer member 20 is deformed so as to be concentrically reduced in a diameter. That is, normally, the heat transfer member 20 is not compressed and deformed as intended. However, by making the inner peripheral shape of the metal holder 40 elliptical, it is possible to release the thickness of the portion of the heat transfer member 20 to he attached to the stepped portion of the terminal-equipped electric wire 10 to a target position. Therefore, the connector 1 according to the present embodiment can adjust the compression and deformation of the heat transfer member 20 to an appropriate state.

Similarly, even when the terminal-equipped electric wire 10 has the stepped shape on the outer surface of the connection portion between the terminal 12 and the electric wire 11, the inner peripheral shape of the metal holder 40 has a substantially elliptical shape, so that the compression and deformation of the heat transfer member 20 is adjusted to an appropriate state. In addition, the heat transfer member 20 is provided with the slit 23 for assisting the compression and deformation of the tubular portion 21. Therefore, in the connector 1 according to the present embodiment, the heat transfer member 20 can be appropriately compressed and deformed so as to be in close contact with both the outer peripheral surfaces of the electric wire connection portion 17 of the terminal 12 and the one end portion 11c of the electric wire 11 and the inner peripheral surface of the base holder 50.

In the present embodiment, the slit 23 extending in the front-rear direction is provided in the tubular portion 21, but the present disclosure is not limited thereto, and the slit 23 may have another shape as long as the compression and deformation of the heat transfer member 20 is assisted. For example, the slit 23 may be provided in the tubular portion 21 along the peripheral direction of the heat transfer member 20.

According to the connector 1 of the present embodiment, the metal holder 40 has the flange portion 48 that is fastened and taxed to the attachment target portion (not illustrated) of the connector 1 provided in the vehicle. Accordingly, the heat generated in the terminal 12 is transmitted to the metal holder 40 via the heat transfer member 20, and the heat is transmitted to and absorbed by the attachment target portion (not illustrated) via the flange portion 48 of the metal holder 40 and the bolt (not illustrated) inserted through the bolt insertion hole 49.

As a result, the connector 1 according to the present embodiment suppresses an excessive rise in the operating temperature of the terminal 12 and has the excellent heat dissipation performance.

As another effect, in the connector 1 according to the present embodiment, since the heat transfer member 20 has the elasticity, the terminal 12 can be protected from an impact caused by an external factor.

While the presently disclosed subject matter has been described with reference to certain exemplary embodiments thereof, the scope of the presently disclosed subject matter is not limited to the exemplary embodiments described above, and it will be understood by those skilled in the art that various changes and modifications may be made therein without departing from the scope of the presently disclosed subject matter as defined by the appended claims.

According to an aspect of the embodiments described above, a connector (1) includes a terminal-equipped electric wire (10) having a terminal (12) connected to an end portion (for example, one end portion 11c) of an electric wire (11), housing (91)) con figured to accommodate the terminal and to hold the terminal-equipped electric wire and a heat transfer member (20) having elasticity. The housing (90) includes a first housing (for example, inner housing main body 60) having a terminal accommodating portion (for example, female terminal, accommodating portion 64) configured to accommodate the terminal, and a second housing (for example, base bolder 50) configured to hold the to electric wire. The second housing (for example, base holder 50) includes a resin holder (30) configured to be externally mounted on an electric wire connection portion (17) of the terminal configured to be connected to the electric wire and the end portion (for example, one end portion 11c) of the electric wire, and a metal holder (40) configured to externally mounted on the resin holder. The heat transfer member (20) is disposed in a compressed and deformed state between an outer circumferential surface of at least one of the electric wire connection portion (17) of the terminal and the end portion (for example, one end portion 11c) of the electric wire and an inner circumferential surface of the second housing (for example, base holder 50), the heat transfer member (20) contacting in a pressed manner the outer circumferential surface of the at least one of the electric wire connection portion (17) and the end portion (for example, one end portion 11c) of the electric wire and the inner circumferential surface of the second housing (for example, base holder 50).

The beat transfer member (20) may be disposed between outer circumferential surfaces of the electric wire connection portion (17) and the end portion (for example, one end portion 11c) of the electric wire and the inner circumferential surface of the second housing. (for example, base holder 50).

The heat transfer member (20) may have a tubular shape.

The second housing (base holder 50) may have an inner peripheral shape corresponding to an outer peripheral shape of the heat transfer member (20) that is compressed and deformed.

The metal holder (40) may include a flange portion (48) extending toward a fixing target member to which the connector (1) is to be fixed, the flange portion (48) being configured to be fastened to the fixing target member.

The heat transfer member (20) may have a slit (23) configured to assist the compression and deformation of the heat transfer member (20).

The connector according to the presently disclosed subject matter will be described below. The heat transfer member having the elasticity is disposed in the compressed and deformed state so as to be in close contact between the outer peripheral surface of at least one of the electric wire connection portion of the terminal and the end portion of the electric wire and the inner peripheral surface of the second housing that holds the terminal-equipped electric wire. Accordingly, by absorbing the heat generated at the terminal at the time of energization by the heat transfer member having a large heat capacity, even when a heat generation amount of the terminal per unit time is large as in the case of the rapid charging, a rapid rise in an operating temperature of the terminal can be suppressed, and the operating temperature of the terminal can slowly rise. Further, the second housing includes the resin holder that is externally mounted on the electric wire connection portion of the terminal and the end portion of the electric wire, and the metal holder that is externally mounted on the resin holder. As a result, the electric wire connection portion of terminal and the end portion of the electric wire are insulated and protected from the metal holder by the resin holder. The heat absorbed by the heat transfer member is efficiently transferred from the inside to the outside of the connector. Therefore, the connector of the presently disclosed subject matter suppresses an excessive rise in the operating temperature of the terminal and has an excellent heat dissipation performance.

What is claimed is:

1. A connector comprising:
    a terminal-equipped electric wire having a terminal connected to an end portion of an electric wire;
    housing configured to accommodate the terminal and to hold the terminal-equipped electric wire; and
    a heat transfer member having elasticity,
    wherein the housing includes a first housing having a terminal accommodating portion configured to accommodate the terminal, and a second housing configured to hold the terminal-equipped electric wire,
    wherein the second housing includes a resin holder configured to be externally mounted on an electric wire connection portion of the terminal configured to be connected to the electric wire and the end portion of the electric wire, and a metal holder configured to be externally mounted on the resin holder, and
    wherein the heat transfer member is disposed in a compressed and deformed state between an inner circumferential surface of the second housing and an outer circumferential surface of at least one of the electric wire connection portion of the terminal and the end portion of the electric wire, the heat transfer member contacting in a pressed manner the inner circumferential surface of the second housing and the outer circumferential surface of the at least one of the electric wire connection portion and the end portion of the electric wire.

2. The connector according to claim 1,
    wherein the heat transfer member is disposed between outer circumferential surfaces of the electric wire connection portion and the end portion of the electric wire and the inner circumferential surface of the second housing.

3. The connector according to claim 1,
    wherein the heat transfer member has a tubular shape.

4. The connector according to claim 1,
    wherein the second housing has an inner peripheral shape corresponding to an outer peripheral shape of the heat transfer member that is compressed and deformed.

5. The connector according to claim 1,
    wherein the metal holder includes a flange portion extending toward a fixing target member to which the connector is to be fixed, the flange portion being configured to be fastened to the fixing target member.

6. The connector according to claim 1,
    wherein the heat transfer member has a slit configured to assist the compression and deformation of the heat transfer member.

7. The connector according to claim 1,
    wherein the heat transfer member is in close contact with the electric wire connection portion of the terminal and the end portion of the electric wire, so that conductor core wires of the electric wire are not exposed.

* * * * *